(12) United States Patent
Yu et al.

(10) Patent No.: US 8,705,216 B2
(45) Date of Patent: Apr. 22, 2014

(54) HIGH SENSITIVITY LEAKAGE CURRENT DETECTION INTERRUPTER

(75) Inventors: Fang Yu, Zhejiang (CN); Yong Dai, Zhejiang (CN); Rongqiang Yao, Zhejiang (CN)

(73) Assignee: Hen Chen, Shanghai (CN)

( * ) Notice: Subject to any disclaimer, the term of this patent is extended or adjusted under 35 U.S.C. 154(b) by 358 days.

(21) Appl. No.: 13/246,419

(22) Filed: Sep. 27, 2011

(65) Prior Publication Data

US 2012/0075756 A1    Mar. 29, 2012

(30) Foreign Application Priority Data

Sep. 27, 2010  (CN) .......................... 2010 1 0292943

(51) Int. Cl.
*H02H 3/26*  (2006.01)

(52) U.S. Cl.
USPC ................ 361/42; 361/100; 361/101; 361/79

(58) Field of Classification Search
USPC .......................................... 361/42, 101, 100
See application file for complete search history.

(56) References Cited

U.S. PATENT DOCUMENTS

| | | | | |
|---|---|---|---|---|
| 3,848,158 A | * | 11/1974 | Dumas | 361/5 |
| 4,499,452 A | * | 2/1985 | Nicolas | 307/3 |
| 5,963,406 A | * | 10/1999 | Neiger et al. | 361/42 |
| 2010/0073178 A1 | * | 3/2010 | Huang et al. | 340/664 |

* cited by examiner

*Primary Examiner* — Rexford Barnie
*Assistant Examiner* — Angela Brooks
(74) *Attorney, Agent, or Firm* — The PL Law Group, PLLC

(57) ABSTRACT

A high sensitivity leakage current detection interrupter (LCDI) includes a shielded wire, a current leakage detection unit, and a tripping mechanism. A live core and a neutral core of the shielded wire are respectively wrapped in two conductive shell wires. The current leakage detection unit includes a pair of rectifying diodes reversely connected in series between a live line and a neutral line of a power supply, a voltage dropping resistor, thyristors, and resistor-capacitor (RC) voltage dropping filter circuits. The tripping mechanism includes control units with on/off respectively controlled by the thyristors. When either of the thyristors is turned on, the corresponding control unit is turned on, and the tripping mechanism is actuated to switch off the power supply.

12 Claims, 3 Drawing Sheets

HIGH SENSITIVITY LEAKAGE CURRENT DETECTION INTERRUPTER

CROSS-REFERENCE TO RELATED APPLICATIONS

This non-provisional application claims priority under 35 U.S.C. §119(a) on Patent Application No. 201010292943.8 filed in China on Sep. 27, 2010, the entire contents of which are hereby incorporated by reference.

Some references, if any, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to a leakage current detection interrupter (LCDI), and more particularly to an LCDI with a simple yet novel structure, capable of respectively detecting leakage currents of a live line and a neutral line.

BACKGROUND OF THE INVENTION

An LCDI is a safety protection device installed between a power supply and an electrical equipment, and mainly includes a shielded wire, a leakage current detection unit, a tripping mechanism, and other circuit protection devices. The existing LCDI is usually required to be used in an integrated circuit (IC). For example, CN1988099B has disclosed an LCDI having a fireproof shielded wire. Referring to FIG. 1, the LCDI includes a current leakage detection unit, and when a current leakage accident occurs, an induction coil detects an unbalanced current passing through a live line and a neutral line and then breaks contact between moving and stationary contacts of a tripping mechanism. The LCDI further includes a fireproof unit, which includes two rectifying components respectively connected to the live line and the neutral line of a grid, voltage dropping components respectively connected in series to the two rectifying components, and a fireproof connecting end extending from the voltage dropping components. The LCDI further includes a fireproof shielded wire. The live core and the neutral core are respectively connected to output ends of the live line and the neutral line of the LCDI and are wrapped by a copper braided wire. One end of the copper braided wire is connected to the fireproof connecting end of the fireproof unit. When the copper braided wire contacts the live core and/or the neutral core, the fireproof unit produces a separation from the live line and/or the neutral line, resulting in the unbalanced current passing through the live line and the neutral line, thereby breaking the contact between the moving and stationary contacts of the tripping mechanism.

The above technical solution requires the use of an integrated chip for receiving a signal from the induction coil and outputting the signal after adjustment to control the tripping mechanism, causing the relatively high cost of the entire LCDI. Besides, as the induction coil is used for detecting the leakage current, possibly a tiny leakage current in the circuit cannot be detected, and therefore hidden danger exists.

Therefore, a heretofore unaddressed need exists in the art to address the aforementioned deficiencies and inadequacies.

SUMMARY OF THE INVENTION

In one aspect, the present invention is directed to an LCDI with a simple yet novel structure and a high precision, capable of respectively detecting leakage currents of a live line and a neutral line.

In one embodiment, the high sensitivity LCDI according to the present invention includes a shielded wire, a current leakage detection unit, and a tripping mechanism.

A live core and a neutral core of the shielded wire are respectively wrapped in two conductive shell wires.

The current leakage detection unit includes rectifying diodes, thyristors, and a voltage dropping resistor. Both the rectifying diodes and the thyristors are disposed in pairs. The two rectifying diodes are reversely connected in series between a live line and a neutral line of a power supply. Anodes of the two rectifying diodes are connected, and cathodes of the two rectifying diodes are respectively connected to the live line and the neutral line. One end of the voltage dropping resistor is connected to the anodes of the rectifying diodes, and the other end of the voltage dropping resistor is connected to the shell wires of the shielded wire. Control electrodes of the thyristors are respectively connected to the cathodes of the rectifying diodes, cathodes of the thyristors are respectively connected to the live line and the neutral line, and resistor-capacitor (RC) voltage dropping filter circuits are connected in parallel between the cathodes and the control electrodes of the thyristors.

The tripping mechanism includes control units with on/off respectively controlled by the thyristors. When either of the thyristors is turned on, the corresponding control unit is turned on and the tripping mechanism is actuated to switch off the power supply.

The control unit may be an electromagnetic coil, a relay, or an optocoupler switch.

In an embodiment of the present invention, another two reverse rectifying diodes are further connected between the live line, the neutral line, and the anodes of the thyristors, thereby preventing the thyristors from reverse breakdown by using the reverse blocking characteristics of the diodes.

In another embodiment of the present invention, the control electrodes of the thyristors are further respectively connected to current limiting resistors. The current limiting resistors are respectively connected in series between capacitors and resistors of the RC voltage dropping filter circuits. A threshold of turning on the thyristors can be controlled by adjusting resistance of the current limiting resistors.

The present invention, among other things, has the following advantages.

1. A simple yet novel electronic component is used to replace the integrated chip in the related art, not only making the circuit structure simple and reliable, but also reducing the product cost.

2. The design of a balanced circuit is adopted, in which the threshold of phase L is symmetrical to the threshold of phase N, and the threshold can be set in a wide range (adjustable in 1 uA-5 mA). The threshold has advantages of high precision, high sensitivity, and being continuously adjustable.

3. A structure of a single mechanism and double control units is adopted, in which the same electromagnetic trip unit is separately controlled by two control units, and the same contact mechanism is used so as to respectively protect the live line (L) and the neutral line (N) from outward current leakage fault.

4. In a normal situation without any current leakage, the reverse blocking characteristics of the rectifying diodes are used to disconnect the power connection between the shielded layer and the power line in a special cable for power supply, thereby ensuring security of the user during normal use.

5. The present invention has anti-electromagnetic interference capability, and can pass the detection for electro magnetic compatibility (EMC) required by Underwriters Laboratories Inc. (UL) and International Electro-technical Commission (IEC) (3C).

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
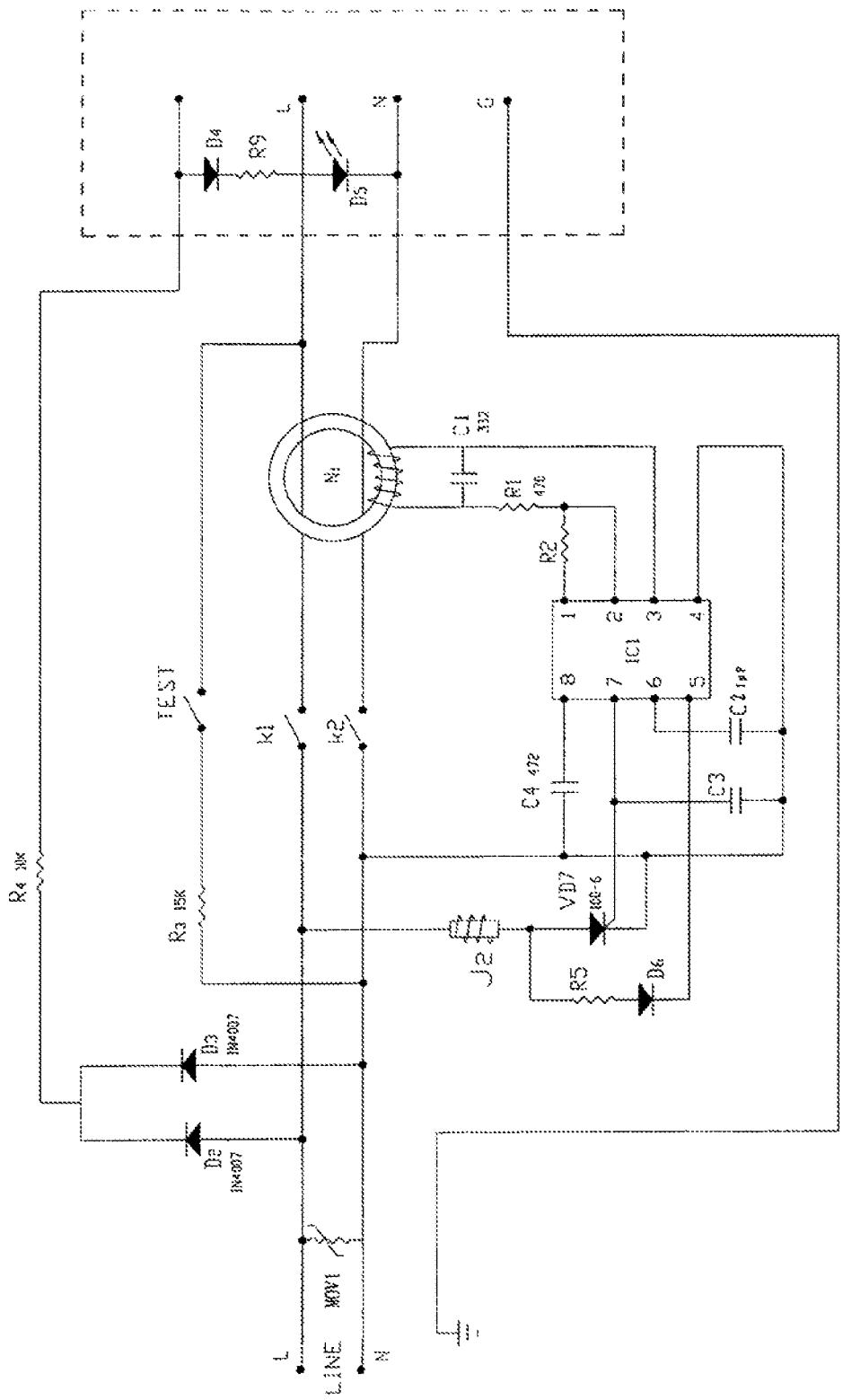
FIG. 1 is a schematic view of a circuit structure of an LCDI in the related art.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

Figure 2:
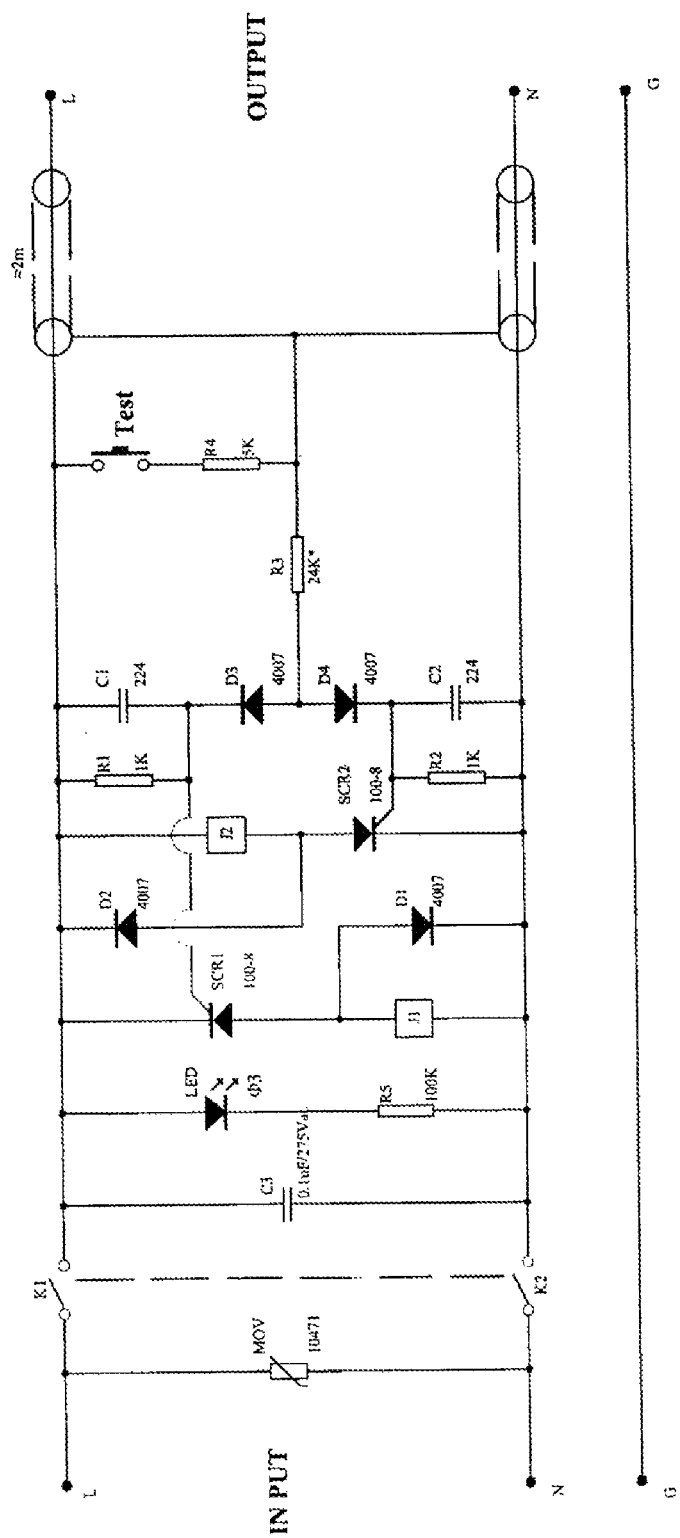
FIG. 2 is a schematic view of a circuit structure of an embodiment of a high sensitivity LCDI according to the present invention.

Referring to FIG. 2, an LCDI according to one embodiment of the present invention mainly includes a shielded wire, a current leakage detection unit, and a tripping mechanism. The shielded wire includes a live core and a neutral core, respectively wrapped by a conductive shell wire (circle on the right side of the figure). The shell wire may be a copper braided wire or other metal braided wires with conductivity. One end of the live shell wire and one end of the neutral shell wire are connected to the current leakage detection unit through a voltage dropping resistor R3.

The current leakage detection unit includes the voltage dropping resistor R3, and further includes rectifying diodes D3, D4, thyristors SCR1, SCR2, and respective RC voltage dropping filter circuits thereof. The rectifying diodes D3 and D4, connected in series between a live line and a neutral line of a power supply, are reversely set. Anodes of the rectifying diodes D3 and D4 are connected together to R3, and cathodes of the rectifying diodes D3 and D4 are respectively connected to the live line and the neutral line, therefore playing a role of separating the live line and the neutral line in a normal situation. A control electrode of the thyristor SCR1 is connected to the cathode of the rectifying diode D3, the cathode is connected to the live line, and the RC voltage dropping filter circuit formed by a resistor R1 and a capacitor C1 that are connected in parallel is provided between the cathode and the control electrode. Similarly, a control electrode of the thyristor SCR2 is connected to the cathode of the rectifying diode D4, the cathode is connected to the neutral line, and the RC voltage dropping filter circuit formed by a resistor R2 and a capacitor C2 that are connected in parallel is provided between the cathode and the control electrode.

The tripping mechanism includes a trip unit and control units. Switches K1 and K2 of the trip unit are respectively connected to the live line and the neutral line, and used for disconnecting the live line or the neutral line. K1 and K2, linked switches under the control of the same tripping mechanism, are alternately controlled by two control units J1 and J2. No matter whether J1 or J2 is turned on, K1 and K2 can be actuated at the same time, so as to switch off the power supply of the neutral line and the live line. The control units J1 and J2 may be electromagnetic coils, relays, optocoupler switches, or other similar components having the same function. J1 is connected between the neutral line and the anode of the thyristor SCR1, and J2 is connected to the live line and the anode of the thyristor SCR2. Rectifying diodes D2 and D1, in opposite directions to the thyristors SCR1, SCR2, are further connected respectively between the live line and the anode of SCR2, and between the neutral line and the anode of SCR1.

Finally, the LCDI further includes a light emitting diode (LED) and a protective resistor R5 thereof connected between the neutral line and the live line, and a test key Test and a protective resistor R4 thereof connected between the live line and the shielded shell wire.

For example, if current leakage occurs in the live line, the interrupter shown in FIG. 2 operates as follows. When current leakage occurs in the live line, the shell wire wrapping the live core in the shielded wire becomes live, that is, the live line and R3 are conducted, and the leakage current passes through D4 and triggers the thyristor SCR2, thereby triggering the control unit J2 of the tripping mechanism, so that the trip unit is actuated, K1 and K2 are turned off at the same time, the power supply is switched off, and the LED is powered off.

Similarly, if current leakage occurs in the neutral line, the shell wire wrapping the neutral core in the shielded wire becomes live, that is, the neutral line and R3 are conducted, the leakage current passes through D3 and triggers the thyristor SCR1, thereby triggering the control unit J1 of the tripping mechanism, so that the trip unit is actuated, K1 and K2 are turned off at the same time, the power supply is switched off, and the LED is powered off.

Figure 3:
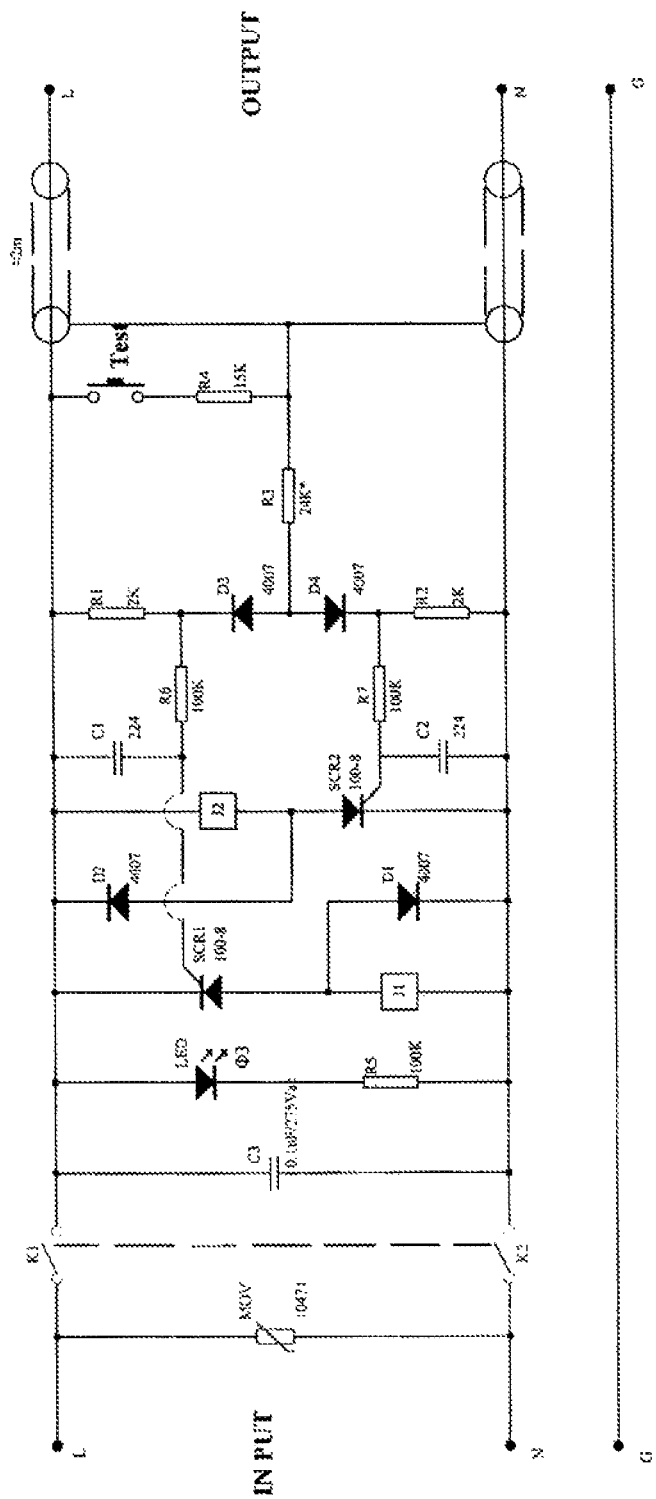
FIG. 3 is a schematic view of a circuit structure of another embodiment of the high sensitivity LCDI according to the present invention.

Referring to FIG. 3, in another embodiment of the present invention, the leakage current detection circuit further includes current limiting resistors R6 and R7. The current limiting resistor R6 is located between R1 and C1 in the RC voltage dropping filter circuit of the thyristor SCR1, and is connected to the control electrode of SCR1. The current limiting resistor R7 is located between R1 and C1 in the RC voltage dropping filter circuit of the thyristor SCR2, and is connected to the control electrode of SCR2.

Accordingly, in one aspect of the present invention, a leakage current detection interrupter (LCDI) is provided. In one embodiment, the LCDI has a shielded wire having a live core and a neutral core, which are respectively wrapped in two conductive shell wires.

The LCDI further has a current leakage detection unit. In one embodiment, the current leakage detection unite includes a pair of rectifying diodes reversely coupled in series between a live line and a neutral line of a power supply, wherein anodes of the rectifying diodes are coupled together and cathodes of the rectifying diodes are respectively coupled to the live line and the neutral line; a voltage dropping resistor, wherein one end of the voltage dropping resistor is coupled to the anodes of the rectifying diodes, and the other end of the voltage dropping resistor is coupled to the conductive shell wires of the shielded wire; and at least two thyristors, wherein control electrodes of the at least two thyristors are respectively coupled to the cathodes of the rectifying diodes, cathodes of the at least two thyristors are respectively coupled to the live line and the neutral line, and resistor-capacitor (RC) voltage dropping filter circuits are coupled in parallel between the cathodes and the control electrodes.

The LCDI also has a tripping mechanism, comprising control units with on/off respectively controlled by the at least two thyristors, wherein if one of the at least two thyristors is turned on, the corresponding control unit is turned on, and the tripping mechanism is actuated to switch off the power supply.

In one embodiment, reverse rectifying diodes are further coupled between the live line, the neutral line, and the at least two thyristors, and anodes of the reverse rectifying diodes are respectively coupled to anodes of the at least two thyristors and the cathodes of the reverse rectifying diodes are respectively connected to the live line and the neutral line.

In one embodiment, the control electrodes of the thyristors are further respectively coupled to current limiting resistors, and the current limiting resistors are respectively coupled in series between capacitors and resistors of the RC voltage dropping filter circuits.

In one embodiment, the LCDI further has an indicating unit, wherein the indicating unit comprises a light emitting diode (LED) and a protective resistor thereof coupled in series between the live line and the neutral line.

In one embodiment, the LCDI further has a testing unit, wherein the testing unit comprises a test key and a protective resistor thereof coupled between the live line and the other end of the voltage dropping resistor.

In one embodiment, the control unit is an electromagnetic coil, a relay, or an optocoupler switch.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A high sensitivity leakage current detection interrupter (LCDI), comprising:
    a shielded wire, wherein a live core and a neutral core of the shielded wire are respectively wrapped in two conductive shell wires;
    a current leakage detection unit, comprising:
        a pair of rectifying diodes reversely connected in series between a live line and a neutral line of a power supply, wherein anodes of the rectifying diodes are connected together and cathodes of the rectifying diodes are respectively connected to the live line and the neutral line;
        a voltage dropping resistor, wherein one end of the voltage dropping resistor is connected to the anodes of the rectifying diodes, and the other end of the voltage dropping resistor is connected to the shell wires of the shielded wire; and
        thyristors, wherein control electrodes of the thyristors are respectively connected to the cathodes of the rectifying diodes, cathodes of the thyristors are respectively connected to the live line and the neutral line, and resistor-capacitor (RC) voltage dropping filter circuits are connected in parallel between the cathodes and the control electrodes; and
    a tripping mechanism, comprising control units with on/off respectively controlled by the thyristors, wherein if one of the thyristors is turned on, the corresponding control unit is turned on, and the tripping mechanism is actuated to switch off the power supply.

2. The high sensitivity LCDI according to claim 1, wherein reverse rectifying diodes are further connected between the live line, the neutral line, and the thyristors, and anodes of the reverse rectifying diodes are respectively connected to anodes of the thyristors and the cathodes of the reverse rectifying diodes are respectively connected to the live line and the neutral line.

3. The high sensitivity LCDI according to claim 2, wherein the control electrodes of the thyristors are further respectively connected to current limiting resistors, and the current limiting resistors are respectively connected in series between capacitors and resistors of the RC voltage dropping filter circuits.

4. The high sensitivity LCDI according to claim 2, further comprising an indicating unit, wherein the indicating unit comprises a light emitting diode (LED) and a protective resistor thereof connected in series between the live line and the neutral line.

5. The high sensitivity LCDI according to claim 2, further comprising a testing unit, wherein the testing unit comprises a test key and a protective resistor thereof connected between the live line and the other end of the voltage dropping resistor.

6. The high sensitivity LCDI according to claim 1, wherein the control unit is an electromagnetic coil, a relay, or an optocoupler switch.

7. A leakage current detection interrupter (LCDI), comprising:
    a shielded wire having a live core and a neutral core, which are respectively wrapped in two conductive shell wires;
    a current leakage detection unit, comprising:
        a pair of rectifying diodes reversely coupled in series between a live line and a neutral line of a power supply, wherein anodes of the rectifying diodes are coupled together and cathodes of the rectifying diodes are respectively coupled to the live line and the neutral line;
        a voltage dropping resistor, wherein one end of the voltage dropping resistor is coupled to the anodes of the rectifying diodes, and the other end of the voltage dropping resistor is coupled to the conductive shell wires of the shielded wire; and at least two thyristors, wherein control electrodes of the at least two thyristors are respectively coupled to the cathodes of the rectifying diodes, cathodes of the at least two thyristors are respectively coupled to the live line and the neutral line, and resistor-capacitor (RC) voltage dropping filter circuits are coupled in parallel between the cathodes and the control electrodes; and a tripping mechanism, comprising control units with on/off respectively controlled by the at least two thyristors, wherein if one of the at least two thyristors is turned on, the corresponding control unit is turned on, and the tripping mechanism is actuated to switch off the power supply.

8. The LCDI according to claim 7, wherein reverse rectifying diodes are further coupled between the live line, the neutral line, and the at least two thyristors, and anodes of the reverse rectifying diodes are respectively coupled to anodes of the at least two thyristors and the cathodes of the reverse rectifying diodes are respectively connected to the live line and the neutral line.

9. The LCDI according to claim 8, wherein the control electrodes of the thyristors are further respectively coupled to current limiting resistors, and the current limiting resistors are respectively coupled in series between capacitors and resistors of the RC voltage dropping filter circuits.

10. The LCDI according to claim 8, further comprising an indicating unit, wherein the indicating unit comprises a light emitting diode (LED) and a protective resistor thereof coupled in series between the live line and the neutral line.

11. The LCDI according to claim 8, further comprising a testing unit, wherein the testing unit comprises a test key and a protective resistor thereof coupled between the live line and the other end of the voltage dropping resistor.

12. The LCDI according to claim 7, wherein the control unit is an electromagnetic coil, a relay, or an optocoupler switch.

* * * * *